US010296616B2

(12) United States Patent
Neels et al.

(10) Patent No.: US 10,296,616 B2
(45) Date of Patent: May 21, 2019

(54) GENERATION OF A SEARCH QUERY TO APPROXIMATE REPLICATION OF A CLUSTER OF EVENTS

(71) Applicant: Splunk Inc., San Francisco, CA (US)

(72) Inventors: Alice Neels, Berkeley, CA (US); Steve Zhang, San Francisco, CA (US); Marc Robichaud, San Francisco, CA (US)

(73) Assignee: SPLUNK INC., San Francisco, CA (US)

(*) Notice: Subject to any disclaimer, the term of this patent is extended or adjusted under 35 U.S.C. 154(b) by 250 days.

(21) Appl. No.: 14/449,051

(22) Filed: Jul. 31, 2014

(65) Prior Publication Data
US 2016/0034525 A1 Feb. 4, 2016

(51) Int. Cl.
*G06F 17/30* (2006.01)
*G06F 17/00* (2019.01)

(52) U.S. Cl.
CPC .. *G06F 17/30389* (2013.01); *G06F 17/30598* (2013.01)

(58) Field of Classification Search
None
See application file for complete search history.

(56) References Cited

U.S. PATENT DOCUMENTS

| | | | | |
|---|---|---|---|---|
| 5,963,940 A * | 10/1999 | Liddy | | G06F 17/30654 |
| 6,542,889 B1 * | 4/2003 | Aggarwal | | G06F 17/30613 |
| 7,827,123 B1 * | 11/2010 | Yagnik | | G06N 99/005 |
| | | | | 706/12 |
| 8,412,696 B2 | 4/2013 | Zhang et al. | | |
| 8,463,790 B1 * | 6/2013 | Joshi et al. | | 707/738 |
| 8,589,399 B1 * | 11/2013 | Lee et al. | | 707/737 |
| 8,589,403 B2 | 11/2013 | Marquardt et al. | | |
| 8,682,925 B1 | 3/2014 | Marquardt et al. | | |
| 2003/0115188 A1 * | 6/2003 | Srinivasa | | G06F 17/30699 |
| 2003/0177112 A1 * | 9/2003 | Gardner | | 707/3 |
| 2004/0093328 A1 * | 5/2004 | Damle | | G06F 17/2785 |
| 2004/0243554 A1 * | 12/2004 | Broder et al. | | 707/3 |
| 2005/0010555 A1 * | 1/2005 | Gallivan | | 707/2 |
| 2005/0234972 A1 * | 10/2005 | Zeng | | G06F 17/30864 |
| 2007/0198328 A1 * | 8/2007 | Fuller | | G06F 17/30398 |
| | | | | 711/170 |
| 2008/0086363 A1 * | 4/2008 | Kass | | G06Q 10/04 |
| | | | | 705/7.29 |
| 2008/0104063 A1 * | 5/2008 | Gallivan | | G06F 17/30616 |
| 2008/0215546 A1 * | 9/2008 | Baum et al. | | 707/3 |
| 2008/0256063 A1 * | 10/2008 | Nasukawa | | G06F 17/30985 |
| 2009/0063536 A1 * | 3/2009 | Naaman et al. | | 707/102 |
| 2009/0319518 A1 * | 12/2009 | Koudas | | G06F 17/30696 |

(Continued)

OTHER PUBLICATIONS

Krishnan, R et al. "The SPINDLE Disruption-Tolerant Networking System" Military Communications Conference, 2007. MILCOM 2007. IEEE.*

(Continued)

*Primary Examiner* — Polina G Peach
(74) *Attorney, Agent, or Firm* — Perkins Coie LLP

(57) ABSTRACT

A processing device performs a preliminary grouping of data items in a dataset to define one or more clusters and for each cluster, identifies a set of search terms for a search query that would retrieve data items in the cluster upon execution of the search query against the dataset.

34 Claims, 19 Drawing Sheets

(56) References Cited

U.S. PATENT DOCUMENTS

| | | | |
|---|---|---|---|
| 2009/0328226 A1* | 12/2009 | Bradford | G06F 21/6254 726/26 |
| 2010/0011031 A1* | 1/2010 | Huang | G06F 21/552 707/E17.007 |
| 2011/0196837 A1* | 8/2011 | Savunen et al. | 707/634 |
| 2012/0089497 A1* | 4/2012 | Taylor | G06Q 40/04 705/35 |
| 2012/0203584 A1* | 8/2012 | Mishor | G06Q 30/02 705/7.11 |
| 2012/0239650 A1* | 9/2012 | Kim | G06F 17/2785 707/737 |
| 2013/0124525 A1* | 5/2013 | Anderson | G06F 17/30286 707/737 |
| 2013/0318236 A1 | 11/2013 | Coates et al. | |
| 2013/0318603 A1 | 11/2013 | Merza | |
| 2013/0326620 A1 | 12/2013 | Merza et al. | |
| 2014/0059017 A1* | 2/2014 | Chaney | G06F 17/30595 707/692 |
| 2014/0095425 A1* | 4/2014 | Sipple | G06N 7/005 706/52 |
| 2014/0129536 A1* | 5/2014 | Anand | G06Q 10/0635 707/706 |
| 2014/0160238 A1 | 6/2014 | Yim et al. | |
| 2014/0236889 A1 | 8/2014 | Vasan et al. | |
| 2014/0236890 A1 | 8/2014 | Vasan et al. | |
| 2014/0359771 A1* | 12/2014 | Dash | H04L 63/1408 726/23 |
| 2015/0271267 A1* | 9/2015 | Solis | H04L 67/1097 709/213 |
| 2016/0371376 A1* | 12/2016 | Hassan | G06F 17/30864 |

OTHER PUBLICATIONS

Gabriel Pui Cheong Fung et al. "Parameter Free Bursty Events Detection in Text Streams", Proceedings of the 31st VLDB Conference, Trondheim, Norway, 2005 (Year: 2005).*
Bitincka, Ledion, et al., "Optimizing Data Analysis with a Semi-Structured Time Series Database", Splunk Inc., 2010 pp. 1-9.
Carasso, David, "Exploring Splunk Search Processing Language (SPL) Primer and Cookbook", Splunk Inc., 2012 CITO Research, New York, 154 Pages.
http://docs.splunk.com/Documentation/PCI/2.1.1/ [000119] User/IncidentReviewdashboard, 2 Pages (Last accessed Aug. 5, 2014).
"vSphere Monitoring and Performance", VMware, Inc., Update 1, vSphere 5.5, EN-001357-02, 2010-2014, pp. 1-174 http://pubs.vmware.com/ vsphere-55/topic/com.vmware.ICbase/PDF/vsphere-esxi-vcenter-server-551-monitoring-performance-guide.pdf.
U.S. Appl. No. 14/167,316, filed Jan. 29, 2014.
U.S. Appl. No. 14/448,995, filed Jul. 31, 2014.

* cited by examiner

302 → 127.0.0.1 – – admin [12/Jul/2014:15:06:31/934 -0700] "GET /serviceNS/nobody/search/search/jobs/1405548383.120?output_mode=json HTTP/1.0" 200 6049 - - - 7ms 304 → * * * * – – admin ****** GET serviceNS nobody search search jobs * * output_mode json HTTP * * * - - - 7ms

Events

| Clusters | | 1 | 2 | 3 | 4 |
|---|---|---|---|---|---|
| | x | ● | ● | | |
| | y | | | ● | ● |

Events

| Tokens | | 1 | 2 | 3 | 4 |
|---|---|---|---|---|---|
| | A | ● | | | ● |
| | B | ● | | ● | ● |
| | C | ● | ● | ● | ● |
| | D | ● | ● | ● | |
| | E | | | ● | |
| | F | | | | ● |
| | G | | ● | | |
| | H | | ● | | |

FIG. 5B

```
Original Search: 1101
search "error | stats count BY host

Sent to peers: 1102
search "error | prestats count BY host (map)

Executed by search head: 1103
Merge prestats results received from peers (reduce)
```

FIG. 11

FIG. 12B

GENERATION OF A SEARCH QUERY TO APPROXIMATE REPLICATION OF A CLUSTER OF EVENTS

TECHNICAL FIELD

This disclosure relates to the field of data aggregation and analysis systems, and in particular to search term generation for related groups of search results.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 3 illustrates an event and an example list of tokens that may result from tokenization according to an embodiment.

FIG. 5A illustrates a cluster-event matrix in accordance with the disclosed embodiments.

FIG. 5B illustrates a token-event matrix in accordance with the disclosed embodiments.

FIG. 11 illustrates an exemplary search query received from a client and executed by search peers in accordance with the disclosed embodiments.

FIG. 12B illustrates a data summary dialog that enables a user to select various data sources in accordance with the disclosed embodiments.

DETAILED DESCRIPTION

Figure 1A:
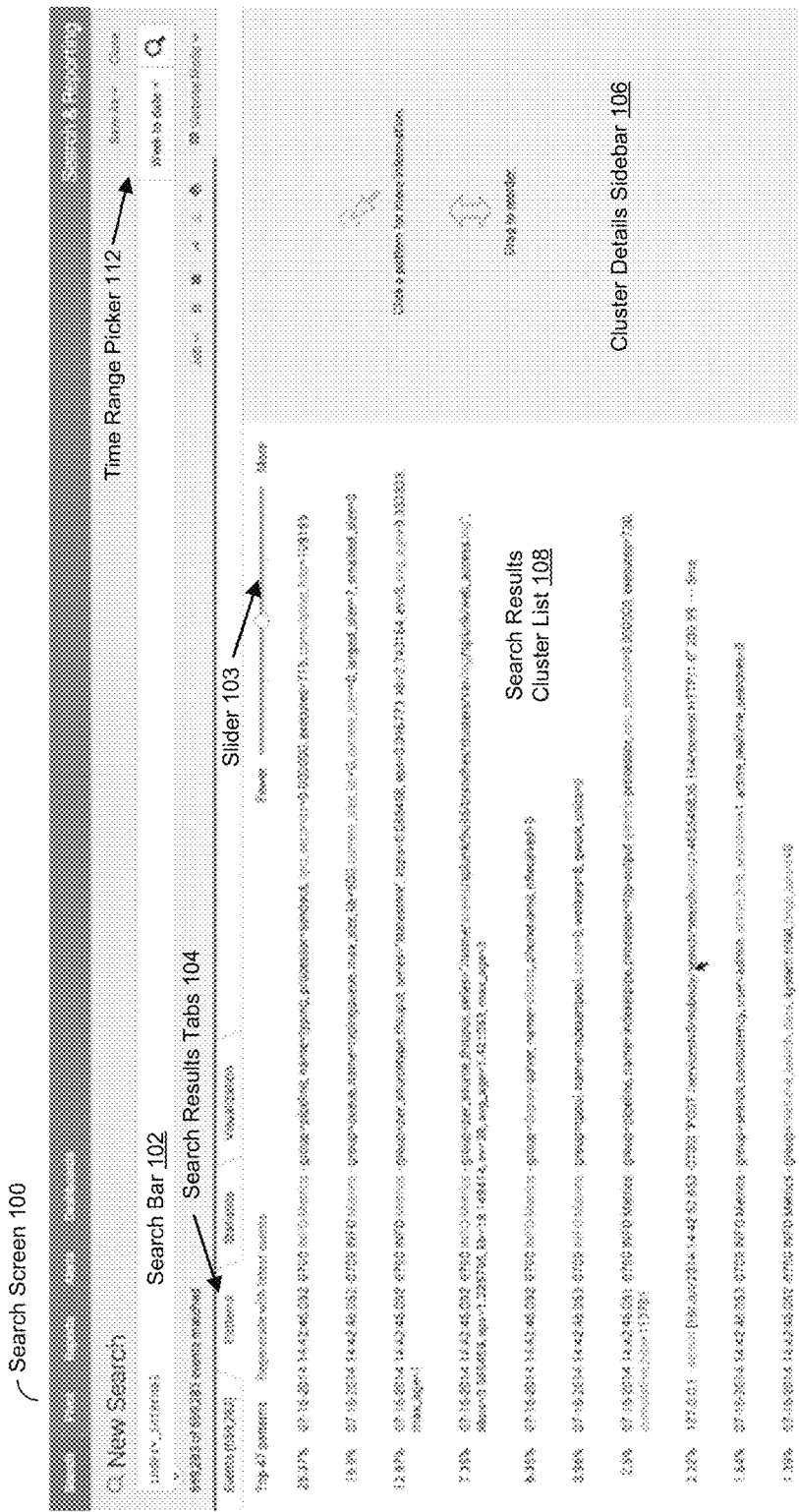
FIGS. 1A and 1B illustrate a search screen in accordance with the disclosed embodiments.

Embodiments are described for search term generation. Modern computer systems generate significant volumes of performance data and diagnostic information which can be used to analyze performance of the system. For example, a data aggregation and analysis system can aggregate heterogeneous machine-generated data received from various sources, including servers, databases, applications, networks, etc. The aggregated source data can be apportioned into multiple events. An event can be represented by a data structure that is associated with a certain point in time and comprises a portion of raw machine data (i.e., machine-generated data). The system can be configured to perform real-time indexing of the source data and to execute real-time, scheduled, or historic searches on the source data.

When a search query is executed, the search query can produce a dataset or a search result that satisfies the search criteria for the search query. The example data aggregation and analysis system can execute a search query to evaluate the source data relative to the search criteria and to produce a resulting dataset. The resulting dataset may comprise one or more data items representing one or more portions of the source data that satisfy the search criteria.

Due to a large volume of source data, defining search queries that can focus on specific types of data and can efficiently produce desired results can be challenging. Aspects of the present disclosure address these challenges by generating search terms for search queries that result in finding meaningful groups of data in an efficient manner. In one embodiment, in order to generate the search terms that would result in finding a meaningful group of data, the system performs preliminary grouping (clustering) of events from source data, and identifies a set of search terms for each group of events, as will be discussed in more detail below. The search terms are selected to try to reproduce the grouping when applied to the events in the source data, and the search terms are used to generate a search query. The search query, when applied to source data, may identify a set of events in the source data that do not exactly match the set of events in the cluster (i.e., they are under-inclusive or over-inclusive of the group of events in the cluster), but the search terms are chosen in an attempt to reproduce the same set of events that the grouping (clustering) process did. The search query can be saved as an event type, which involves assigning a reference name to the search query that can be used to tag events that match the search query. An event type is a user-defined field that simplifies search by letting the user categorize events. Event types allow the user to classify events that have common characteristics (i.e., events having the same event type would be returned as results of a search using the same set of search terms). In an embodiment, an event type is a knowledge object that enables a user to categorize and label all indexed events that match a specified search string (e.g., a search query or search criteria). An event type may have a name and an associated search query or search criteria. A user may create an event type directly or use a device to identify and create an event type. Event types can be stored in system configuration files and information can be extracted from events to determine if they have a certain event type at search time, rather than at a data ingestion time, or a time that the event type was created. If a user wishes to find events similar to a certain event, the user can execute a search query that includes search terms corresponding to the event type of the certain event. Subsequently, if a user wishes to find events that match a saved event type, the user can execute the saved search query that includes the corresponding set of search terms defining the event type.

In one embodiment, preliminary grouping (clustering) serves to identify events or other data items that are at least partially related. An attempt to generate a set of search terms for unrelated events could prove to be challenging. The preliminary grouping can be performed in any number of ways. In one embodiment, the system performs the preliminary grouping by placing events into clusters based on a similarity of the events according to a clustering algorithm. Any type of clustering algorithm may be used to group the events into clusters. One example technique may include identifying one or more tokens (e.g., extracted keywords) associated with each of the events, generating a token vector for each of the events, and grouping events having token vectors within a similarity threshold into a same cluster. In one embodiment, the preliminary grouping is performed on events from the source data. In another embodiment, an initial search is performed on the source data to produce an initial dataset including events that satisfy search criteria of the search, and the preliminary grouping is performed on the events from the initial dataset. For example, a user may provide search criteria, such as a keyword, a (field, value) pair, criteria for a field or some combination of these or other search terms, which is executed against the source data to produce the initial dataset. The search criteria may be provided by a user to assist with the clustering process, or as part of a search previously requested by a user for any reason.

Once the preliminary grouping is performed and the events are grouped into clusters, the system may determine one or more search terms associated with the events in a cluster, include the search terms in a search query, and optionally enable a user to save the search query as an event type. The determined search terms may or may not be associated with an event type, or may be event type eligible searches that are not actually saved as event types. The search terms may, for example, be saved as patterns, searches, or keywords. The search query's search terms are designed to cause the events in the cluster to be returned in response to executing the search query on events from which the cluster was derived, though they may not always exactly match. In one embodiment, the returned events are similar to or the same as in the cluster resulting from the preliminary grouping. Searching using the search query that includes the determined search terms (and that may be saved as an event type) may be faster and less resource intensive that executing the clustering algorithm. Thus, the search terms can be used in the future to locate, in any data, a group of events having similar characteristics as those of events in the cluster. Additional details of certain embodiments of the search term generation algorithm are described below.

Figure 1B:
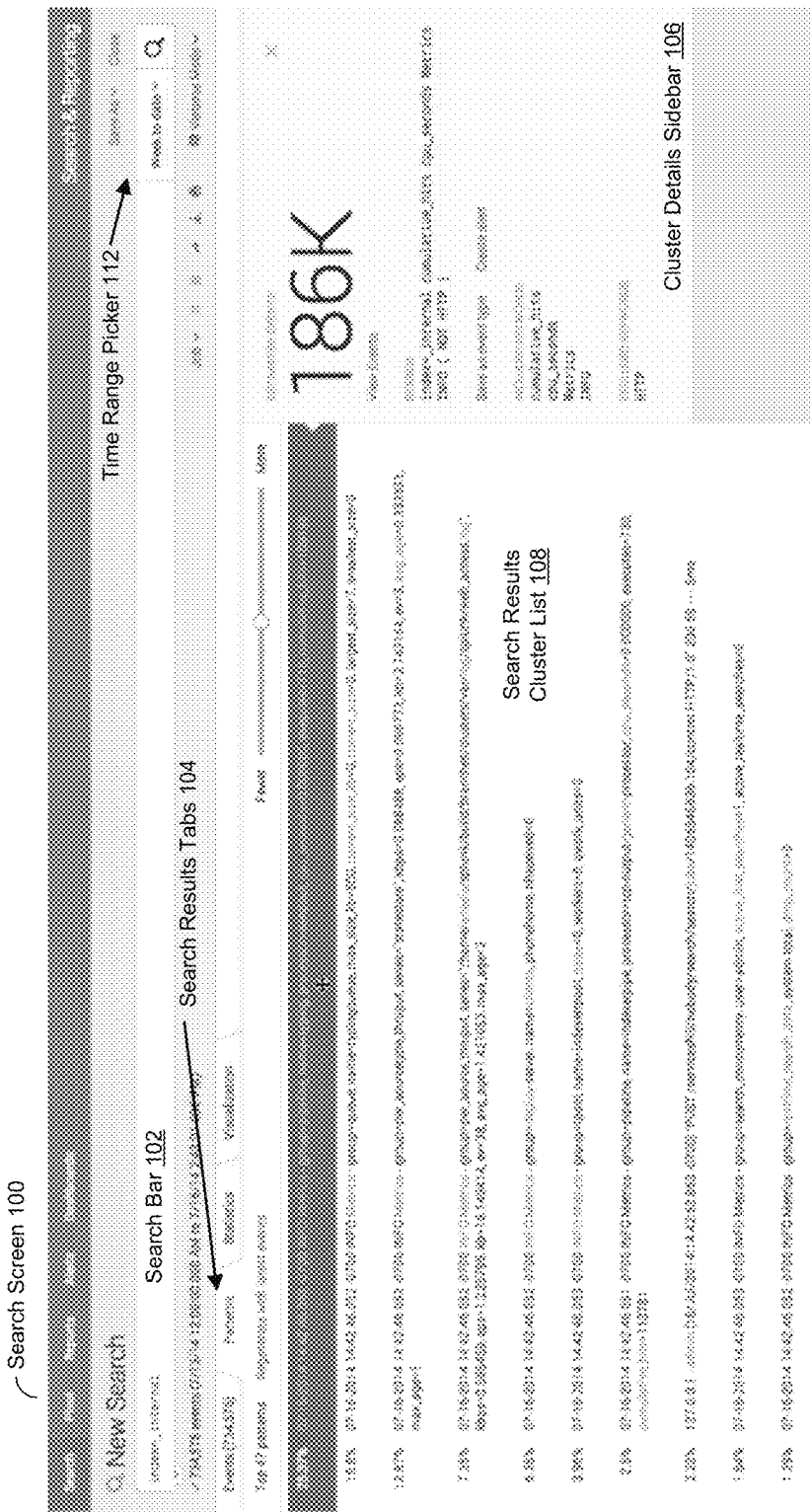

FIGS. 1A and 1B illustrate an exemplary search screen 100 in accordance with the disclosed embodiments. Referring to FIG. 1A, search screen 100 includes a search bar 102 that accepts user input (e.g., a search query) in the form of a search string. Search screen 100 also includes a time range picker 112 that enables the user to specify a time range for the search.

After the search is executed, the search screen 100 can display the results through search results tabs 104, wherein search results tabs 104 includes: an "events tab" that displays various information about events returned by the search; a "patterns tab" that displays patterns in the search results; a "statistics tab" that displays statistics about the search results; and a "visualization tab" that displays various visualizations of the search results. In one embodiment, the patterns tab illustrated in FIG. 1A displays a search results cluster list 108 that enables a user to view the various clusters into which the events in the dataset (the events returned by the search) from the events tab have been grouped. The clusters in search results cluster list 108 may be the result of the preliminary grouping performed by the system. The clusters in search results cluster list 108 may be referred to as "patterns." For each cluster in search results cluster list 108, a representative event and a percentage of the dataset that each of the clusters includes, may also be displayed. For example, for each cluster, an event that has representative characteristics of the other events in the cluster may be displayed. The representative event may include, for example, an average number of tokens that match the search query in search bar 102 among all events in the cluster. In one embodiment, each of the representative events in the search results cluster list 108 may also have certain keywords (i.e., tokens) that match the search query input in the search bar 102 highlighted or otherwise emphasized. The displayed percentage associated with each cluster may indicate what percentage of the events in the dataset (e.g., those shown in the events tab) is a part of each cluster. In one embodiment, search results cluster list 108 may include all identified clusters. In other embodiments, search results cluster list 108 may include only a portion of the identified clusters, such as the most populous clusters. In other embodiments, search results cluster list 108 may include different and/or additional information. In one embodiment, search screen 100 further displays a slider 103. The user may adjust slider 103 between various positions ranging from "More" to "Fewer." The slider 103 controls the clustering process and can be used to adjust how different events can be grouped before being placed in a different cluster. Adjusting the slider closer to "More" may cause there to be more clusters, each having to satisfy stricter matching criteria. Thus, the events in a given cluster may be more closely related. Adjusting the slider closer to "Less" may cause there to be fewer clusters, each having to satisfy more relaxed matching criteria. Thus, the events in a given cluster may be only loosely related. In one embodiment, the patterns tab in search screen 100 further displays a cluster details sidebar 106 that can be used to display information about selected clusters from search results cluster list 108. When no clusters from search results cluster list 108 are selected, however, cluster details sidebar 106 may remain blank or empty.

In the embodiment illustrated in FIG. 1B, one of the clusters (i.e., patterns) in search results cluster list 108 has been selected by the user. In this embodiment, the selected cluster is highlighted, although other indications of the selection may be used. As a result of the cluster selection, the set of search terms for the selected cluster is determined and optionally associated with an event type as discussed herein. Cluster details sidebar 106 may display an approximate or estimated number of events that are part of the cluster, an search that can be executed to identify the events in the cluster based on the determined set of search terms, a list of keywords that should be included in the search based on the determined set of search terms, and a list of keywords that should be excluded from the search based on the determined set of search terms. In one embodiment, the cluster details sidebar 106 may include a link, button or other option, which when selected, displays all of the events that would be found using the search. Other options may include the ability to save the search terms as an event type, and the creation of alert which would notify the user when a certain condition with respect to events that would match the search terms of the event type is satisfied. In other embodiments, cluster details sidebar 106 may include different and/or additional information.

Figure 2:
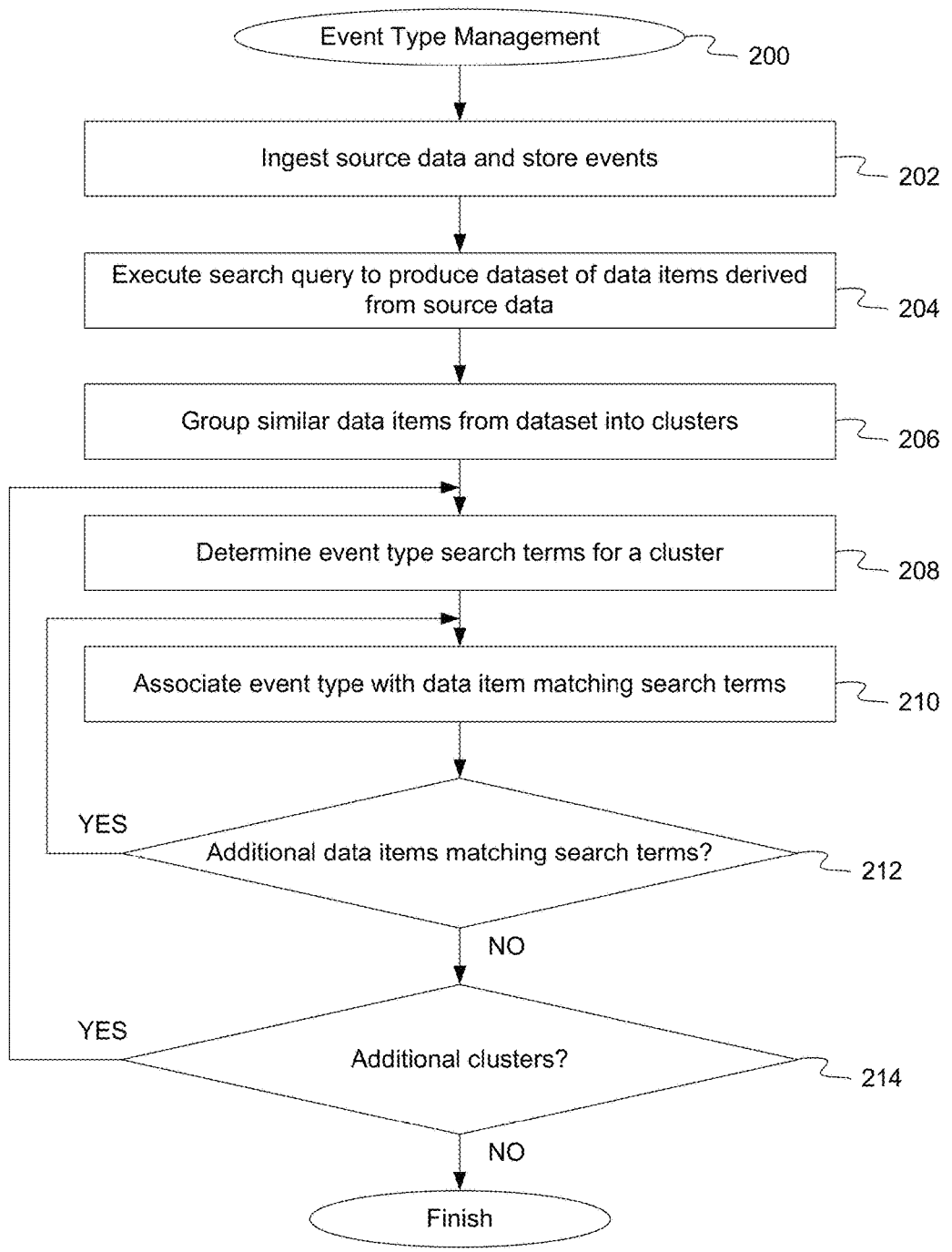
FIG. 2 is a flow diagram illustrating a search term management method, according to an embodiment.

FIG. 2 is a flow diagram illustrating a search term management method, according to an embodiment. The method 200 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to create and manage search terms in an event-based system.

Referring to FIG. 2, at block 202, method 200 ingests the source data and stores the data as events. The data may be received from data sources, such as web servers, application servers, databases, firewalls, routers, operating systems, software applications that execute on computer systems, mobile devices, or sensors. The data generated by such data sources can be produced in various forms including, for example and without limitation, server log files, activity log files, configuration files, messages, network packet data, performance measurements and sensor measurements. Each event may include a collection of performance data and/or diagnostic information that is generated by a computer system and is correlated with a specific point in time. Additional details related to data ingestion and the storing of events are described below with respect to FIG. 8.

Following data ingestion, the system may perform a preliminary grouping of events. As described above, the preliminary grouping can be performed in any manner so as to group similar events into clusters. Blocks 204 and 206 of method 200 describe the preliminary grouping, according to one embodiment. In other embodiments, the preliminary grouping may include different and/or additional operations. At block 204, method 200 executes a search query to produce a dataset of one or more data items derived from the source data. In one embodiment, an indexer searches for events that match the criteria specified in the query. These criteria can include matching keywords or specific criteria or values for certain fields. In a query that uses a late-binding schema, the searching operations in block 204 may involve using the late-binding schema to extract values for specified fields from events at the time the query is processed. The indexers can either send the relevant events back to a search head, or use the events to calculate a partial result, and send the partial result back to the search head. Additional details related to data ingestion and the storing of events are described below with respect to FIG. 9.

At block 206, method 200 groups similar events or other data items from the dataset produced at block 204 into clusters. In one embodiment, the system groups the events in the initial dataset into clusters based on a similarity of the events according to a clustering algorithm. Any type of clustering algorithm may be used to group the events into clusters, including manual grouping. One example clustering algorithm may include identifying one or more tokens associated with each of the events. In one embodiment, this may include a process referred to as "tokenization." Tokenization may include extracting keywords from the raw events. The system may look for delimiters in the text, such as punctuation marks and white space, and use the text between these delimiters as tokens. The system may ignore numbers or other parts of dates or timestamps (e.g., the names of days or months) as they are not likely relevant to the content of the event and may not be useful in clustering the events. FIG. 3 illustrates an event 302 and an example list of tokens 304 that may result from tokenization according to an embodiment. As illustrated, the example event 302 includes various strings of text and numbers interspersed with various punctuation marks and spaces. In order to generate a usable set of tokens 304, the system extracts the text portions of the event 302, separates text portions that are divided by delimiters and ignores the numerical portions of the event 302. The resulting set of tokens 304 is list or group of keywords that represent the content of the event 302.

Referring again to block 206 of FIG. 2, in one embodiment, as part of the clustering process, the system generates a token vector for each event and compares the token vectors to one another in order to identify similar token vectors. The comparison may take into account which tokens are present in the token vector as well as the location of the tokens in the vector (i.e., the order of the tokens). Generally, events which have the same tokens appearing at the same location will be regarded as the most similar, events with the same tokens at different locations will be less similar, and events with different tokens will be the least similar. If the comparison of the token vectors for any two events meets or exceeds a defined similarity threshold (e.g., a certain number of events in common), the system may assign the two events to the same cluster. In another embodiment, when the token vector for a first event assigned to a cluster is used, the system compare subsequent token events to the first token vector defining a cluster to determine if the subsequent events should be placed in that cluster. If a subsequent token vector doesn't meet the similarity threshold, the system may create a new cluster and add the corresponding event to that cluster. The clusters may be tracked using a list of which events are in a given cluster, using a tag in each event indicating the assigned cluster, or in some other fashion.

At block 208, method 200 determines a set of search terms for cluster. The set of search terms are designed to identify similar events, when a search including the set of search terms is executed. The search query including the set of search terms may be saved as an event type. In one embodiment, determining the set of search terms comprises identifying one or more tokens associated with each of the events in the cluster, determining the events in which each of one or more tokens appears (i.e., building a token-event matrix), and calculating a relevance score for each token in the cluster, wherein the relevance score is based at least in part on a percentage of events in each of the one or more clusters that include a given token, an average percentage, across the one or more clusters, of events in the one or more clusters that include the given token, and a variance, across each of the one or more clusters, in percentage of events in the one or more clusters that include the given token. The system identifies a number of tokens having a highest relevance score for the cluster and uses those tokens as the search terms in the search query that may be saved as the event type for that cluster (e.g., the search query defining the event type does a keyword search for events having those tokens, with the specification of the tokens to be keywordsearched being the search terms). In one embodiment, the search terms may include a criterion requiring an absence of a particular keyword. For example, if the sets of search terms for two different clusters are similar, except that the set for one cluster has one or more additional keywords not associated with the other cluster, the search terms for the other cluster may have a criterion requiring the absence of those keywords. If not for this criterion, the results of a search query using both sets of search terms would overlap even though each set is associated with a different cluster. Additional details related to determining the set of search terms are described below with respect to FIG. 4.

At block 210, method 200 associates the event type determined at block 208 with each event meeting the criteria of the search query defining the event type (which may closely track the events in the cluster). In one embodiment, the system tags each event meeting the criteria of the search with an indication of the event type (e.g., a name or other identifier). In another embodiment, the system maintains a list or other data store of the events that have a given event type. In one embodiment, the tagging or other association occurs at a search time when a search query using the set of determined search terms is executed. Any single event can have multiple event types, as it is possible that an event may satisfy the criteria of different search queries used to define different event types. As such, there may be multiple event type identifiers in the metadata for a given event or an event may appear in the lists of multiple event type members. For example, when a user locates a particular event, the user may choose to run a search query associated with an event type that applies to the particular event in order to find other similar events.

At block 212, method 200 determines if there are any additional data items (e.g., events) that match the search query defining an event type. If there are additional data items, method 200 returns to block 210 and associates the event type with each remaining data item. At block 214, method 200 determines if there are any additional clusters determined at block 206. If there are additional clusters, method 200 returns to block 206 and determines the search terms for each remaining cluster or each cluster as they are selected.

Figure 4:
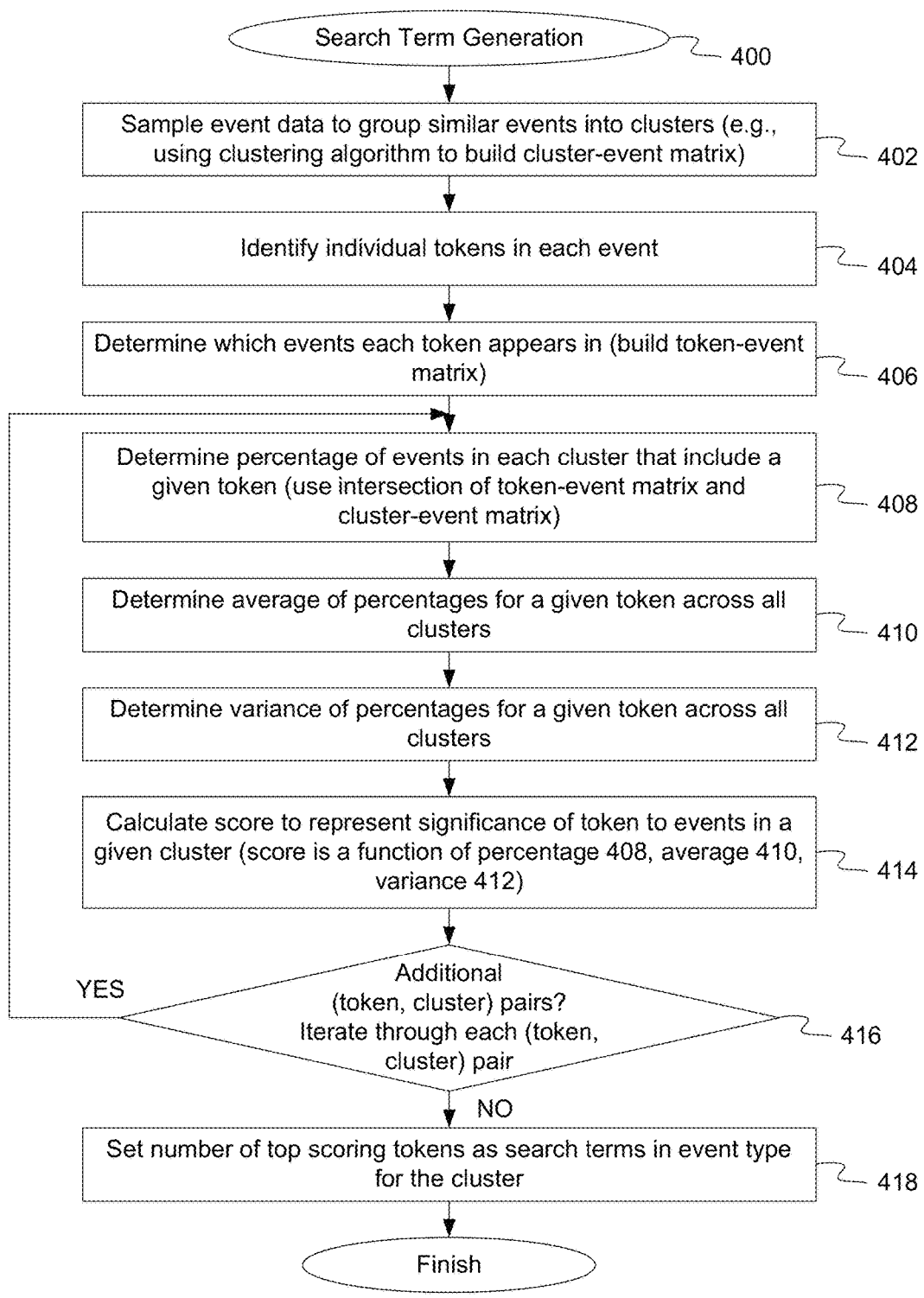
FIG. 4 is a flow diagram illustrating a search term generation method, according to an embodiment.

FIG. 4 is a flow diagram illustrating a search term generation method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to generate search terms for events in an event-based system.

Referring to FIG. 4, at block 402, method 400 performs a preliminary grouping in order to group similar events into clusters. In one embodiment, the system groups the events in an initial dataset into clusters based on a similarity of the events according to a clustering algorithm. Any type of clustering algorithm may be used to group the events into clusters. One example clustering algorithm may include identifying one or more tokens associated with each of the events and generating a token vector for each event. The system compares the token vectors to one another in order to identify similar token vectors. The comparison may take into account which tokens are present in the token vector as well as the location of the tokens in the vector (i.e., the order of the tokens). If the comparison of the token vectors for any two events meets or exceeds a defined similarity threshold (e.g., a certain number of events in common), the system may assign the two events to the same cluster. In other embodiments, the clustering may be performed in some other fashion. By way of example, FIG. 5A illustrates a cluster-event matrix 500 in accordance with the disclosed embodiments. The cluster-event matrix 500 illustrates the events that each cluster includes. In the illustrated example, there are two clusters: x and y. Cluster x includes events 1 and 2, while cluster y includes events 3 and 4. The events may be assigned to the appropriate clusters based, for example, on a similarity of the tokens contained therein.

At block 404, method 400 identifies individual tokens in each event. In one embodiment, this tokenization is performed in the same way as used during the clustering at block 402. For example, tokenization may include extracting keywords from the events. The system may look for delimiters in the text, such as punctuation marks and white space, and use the text between these delimiters as tokens. The system may ignore numbers or other parts of dates or timestamps (e.g., the names of days or months) as they are not likely relevant to the content of the event and may not be useful in clustering the events. In one embodiment, the results of the tokenization performed during the clustering is saved and made available, or otherwise communicated or re-used, for tokenization at block 404. In another embodiment, the tokenization is performed again at block 404 using the same or a different technique. Using the example above, it may be determined that the tokens A, B, C, D, E, F, G and H each appear at least once in the set of events 1, 2, 3 and 4. In another embodiment, in addition to or instead of identifying tokens, the system may identify certain (field, value) pairs present in the events. A (field, value) pair may include two pieces of data: one identifying a particular field in the event; and another to indicate the value present in that field. The presence of particular (field, value) pairs in an event may be useful in determining the search terms that may be useful for including in a search query to reproduce the events in a cluster (and to save as a corresponding event type). Accordingly, it should be understood that throughout the discussion, (field, value) pairs may be used in addition to or in place of tokens when the search term algorithm is being performed.

At block 406, method 400 determines which tokens appear in which events (i.e., builds a token-event matrix). FIG. 5B illustrates a token-event matrix 550 in accordance with the disclosed embodiments. The token-event matrix 550 illustrates the tokens that each event includes. In the illustrated example, event 1 includes tokens A, B, C and D; event 2 includes tokens C, D, G and H; event 3 includes tokens B, C, D and E; and event 4 includes tokens A, B, C and F. Formatted differently, token A appears in events 1 and 4; token B appears in events 1, 3 and 4; token C appears in events 1, 2, 3 and 4; token D appears in events 1, 2 and 3; token E appears in event 3; token F appears in event 4; token G appears in event 2; and token H appears in event 2.

At block 408, method 400 determines a percentage of events in each of the clusters that include a given token. In one embodiment, the system calculates these percentages using an intersection of token-event matrix 550 and cluster-event matrix 500. Continuing with the example from above, the following percentages can be determined:

Token A appears in: 50% of events in cluster x; 50% of events in cluster y

Token B appears in: 50% of events in cluster x; 100% of events in cluster y

Token C appears in: 100% of events in cluster x; 100% of events in cluster y

Token D appears in: 100% of events in cluster x; 50% of events in cluster y

Token E appears in: 0% of events in cluster x; 50% of events in cluster y

Token F appears in: 0% of events in cluster x; 50% of events in cluster y

Token G appears in: 50% of events in cluster x; 0% of events in cluster y

Token H appears in: 50% of events in cluster x; 0% of events in cluster y

At block 410, method 400 determines an average percentage, across the one or more clusters, of events in the one or more clusters that include a given token. Continuing with the example from above, the following averages can be determined:

Token A appears on average in: 50% of events in each cluster

Token B appears on average in: 75% of events in each cluster

Token C appears on average in: 100% of events in each cluster

Token D appears on average in: 75% of events in each cluster

Token E appears on average in: 25% of events in each cluster

Token F appears on average in: 25% of events in each cluster

Token G appears on average in: 25% of events in each cluster

Token H appears on average in: 25% of events in each cluster

At block 412, method 400 determines a variance, across each of the one or more clusters, in percentage of events in the one or more clusters that include the given token. Variance is a statistical measure of how the data distributes itself about the mean or other expected values. The variance takes into account all data points and determines their distribution. In one embodiment, the square of the variance is given by the average of the squares of difference between the data points and the mean. In one embodiment, if the variance is high (indicating different percentages in different clusters), the token may be significant and more likely to be useful in a search to identify certain events containing that token. If the variance is low, however, the token may not be as important for a search. Continuing with the example from above, the following variances can be determined:

Token A has a variance across clusters of: 0

Token B has a variance across clusters of: 25

Token C has a variance across clusters of: 0

Token D has a variance across clusters of: 25

Token E has a variance across clusters of: 25

Token F has a variance across clusters of: 25

Token G has a variance across clusters of: 25

Token H has a variance across clusters of: 25

It should be understood that the calculations performed at blocks 408-414 of method 400 may be performed in the described order or in any other order. In one embodiment, the calculations performed at blocks 408-414 may all be performed in parallel to avoid extra passes through the underlying data.

At block 414, method 400 calculates a relevance score for each token in the cluster. The relevance score represents the significance of the token to identifying events in the cluster, when the token is used as part of a search query. In one embodiment, the calculated relevance score is a function of the percentage determined at block 408, the average determined at block 410 and the variance determined at block 412. In one embodiment, the relevance score is calculated as the product of the difference between the percentage matched from block 408 and the average from block 410 to the fourth power, the variance, and twice the percentage matched from block 408 minus one (e.g., score=difference^4*variance*(percentage matched*2−1). In other embodiments, some other formula may be used to calculate the relevance score that takes into account the same or different factors.

At block 416, method 400 determines if there are additional (token, cluster) pairs for which a relevance score may be calculated. If there are, method 400 repeats the operations in method 400 for each remaining token in the cluster and for each token in every other cluster. If there are no additional (token, cluster) pairs, at block 418, method 400 identifies a number of tokens (e.g., 5 tokens) having a highest relevance score for each of the one or more clusters and sets that number of tokens as the search terms for that cluster. In one embodiment, the system may experiment with adding additional tokens to or removing tokens from the search terms. The system may compare the events identified with the modified search terms to the results using the clustering algorithm at block 402 to identify the number of search terms that results in a closest match. In one embodiment, the system dynamically adds search terms from a ranked list of candidates (e.g., ranked according to the relevance score calculated at block 414) to find search terms that result in the closest match. For example, if five tokens is the default number, the system may first determine how close the results using the first five search terms match the results from the clustering algorithm and then determine how close the results are when using the first six search terms. If the results with six search terms are closer than they were with five, the system may use six search terms in the saved search. This process can continue with trying additional search terms, until the closeness of the match is no longer increasing. Similarly, the results with fewer search terms can be tried to see if that results in a closer match.

Figure 6:
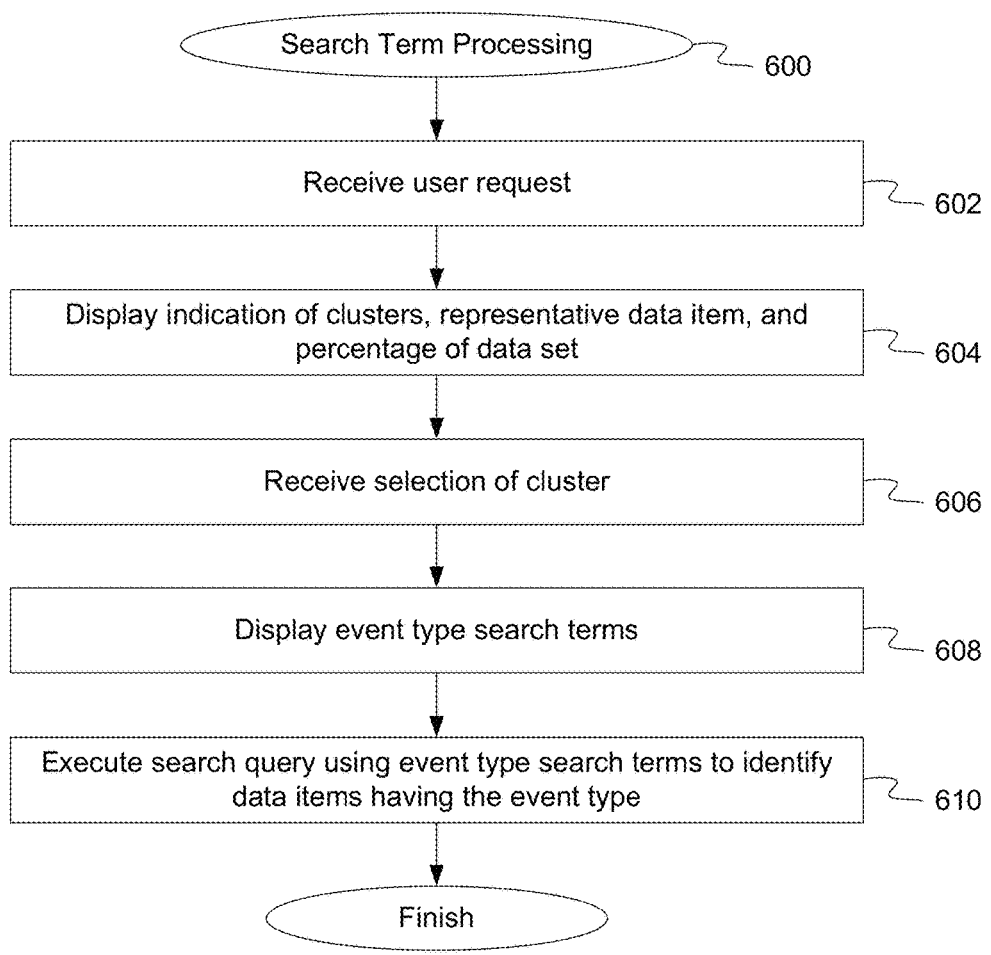
FIG. 6 is a flow diagram illustrating a search term processing method, according to an embodiment.

FIG. 6 is a flow diagram illustrating a search term processing method, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to process events in an event-based system using a determined set of search terms.

Referring to FIG. 6, at block 602, method 600 receives a user request. In one embodiment, the request may be a search query entered into search bar 102 of search screen 100. For example, a user may provide a search query, such as a keyword search, a (field, value) pair, or some combination of these or other search terms, which is executed against the source data to produce an initial dataset.

At block 604, method 600 displays an indication of clusters, a representative data item for each cluster and a percentage of the dataset that each of the one or more clusters includes. For example, for each cluster, an event that has representative characteristics of the other events in the cluster may be displayed. The representative event may include, for example, an average number of tokens that match the search query in search bar 102 among all events in the cluster. In one embodiment, each of the representative data items in the search results cluster list 108 may also have certain keywords (i.e., tokens) that match the search query input to search bar 102 highlighted or otherwise emphasized. In one embodiment, parts of the representative event text that are likely to change among different events (e.g., timestamps or other numerical values) may be obscured or anonymized when the representative event is displayed in search results cluster list 108. The displayed percentage associated with each cluster may indicate what percentage of the events in the dataset (e.g., those shown in the events tab) is a part of each cluster. In one embodiment, this information is displayed in search results cluster list 108 of search screen 100.

At block 606, method 600 receives a second user request, which may be, for example, the selection of one of the clusters or patterns displayed at block 604. In one embodiment, the user may select the cluster using a mouse, keyboard, stylus, pointer, touchscreen, touchpad, microphone, or other user input device.

At block 608, method 600 identifies and displays search terms for the selected cluster. In one embodiment, the information displayed in cluster details sidebar 106 may include an approximate or estimated number of events that are part of the cluster, an search that can be executed to identify the events in the cluster, a list of keywords that should be included in the search, and a list of keywords that should be excluded from the search.

At block 610, method 600 executes a search query using the search terms to identify data items (e.g., events) having the associated event type. In one embodiment, the cluster details sidebar 106 may include a link, button or other option, which when selected, displays all of the events that would be found using the search terms. In response to a selection of the link, the system may execute a search on the source data using the search terms to identify matching events. The resulting events may be the same as or similar to the events determined to be part of the selected cluster at block 606. In other embodiments, the events resulting from the event type search may include different and/or additional events. In one embodiment, the search terms corresponding to the event type may be modified prior to being executed as part of a search query. For example, additional search criteria (e.g., keywords or (field, value) pairs) may be added to the search terms or search criteria may be removed. This can be done to focus the results of the search query in order to include the intended event or group of events.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 7:
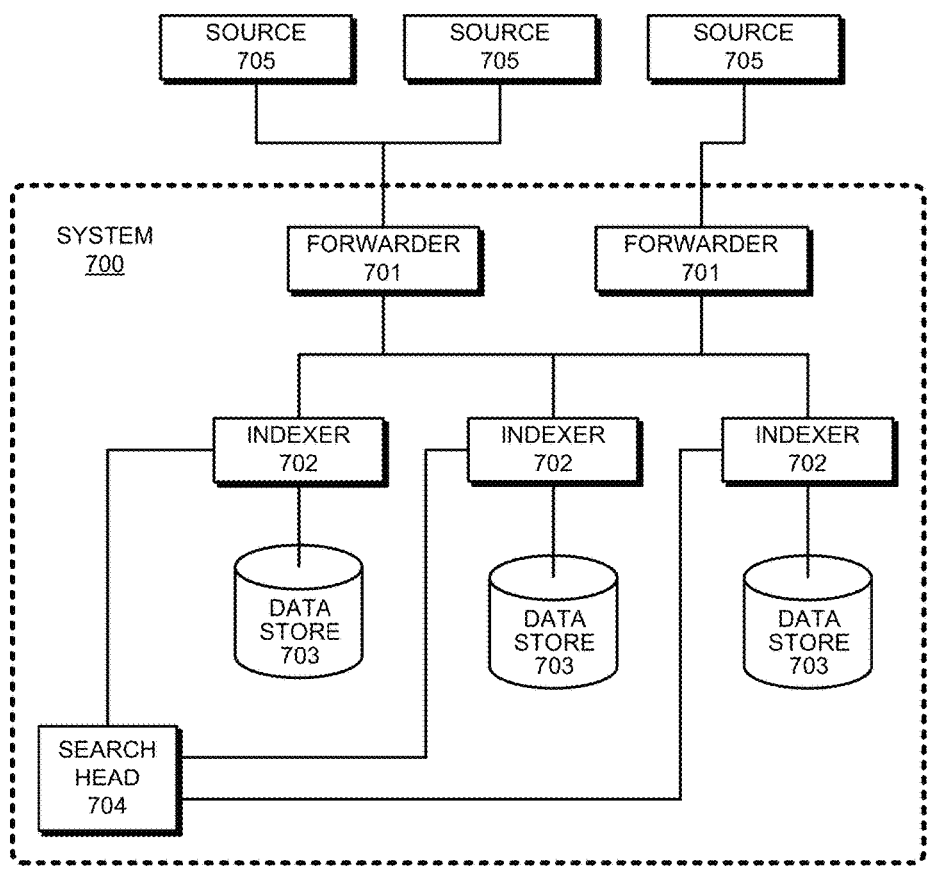
FIG. 7 presents a block diagram of an event-processing system in accordance with the disclosed embodiments.

FIG. 7 presents a block diagram of an exemplary event-processing system 700, similar to the SPLUNK® ENTERPRISE system. System 700 includes one or more forwarders 701 that collect data obtained from a variety of different data sources 705, and one or more indexers 702 that store, process, and/or perform operations on this data, wherein each indexer operates on data contained in a specific data store 703. These forwarders and indexers can comprise separate computer systems in a data center, or may alternatively comprise separate processes executing on various computer systems in a data center.

During operation, the forwarders 701 identify which indexers 702 will receive the collected data and then forward the data to the identified indexers. Forwarders 701 can also perform operations to strip out extraneous data and detect timestamps in the data. The forwarders next determine which indexers 702 will receive each data item and then forward the data items to the determined indexers 702.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 700 and the processes described below with respect to FIGS. 7-11 are further described in "Exploring Splunk Search Processing Language (SPL) Primer and Cookbook" by David Carasso, UM Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 8:
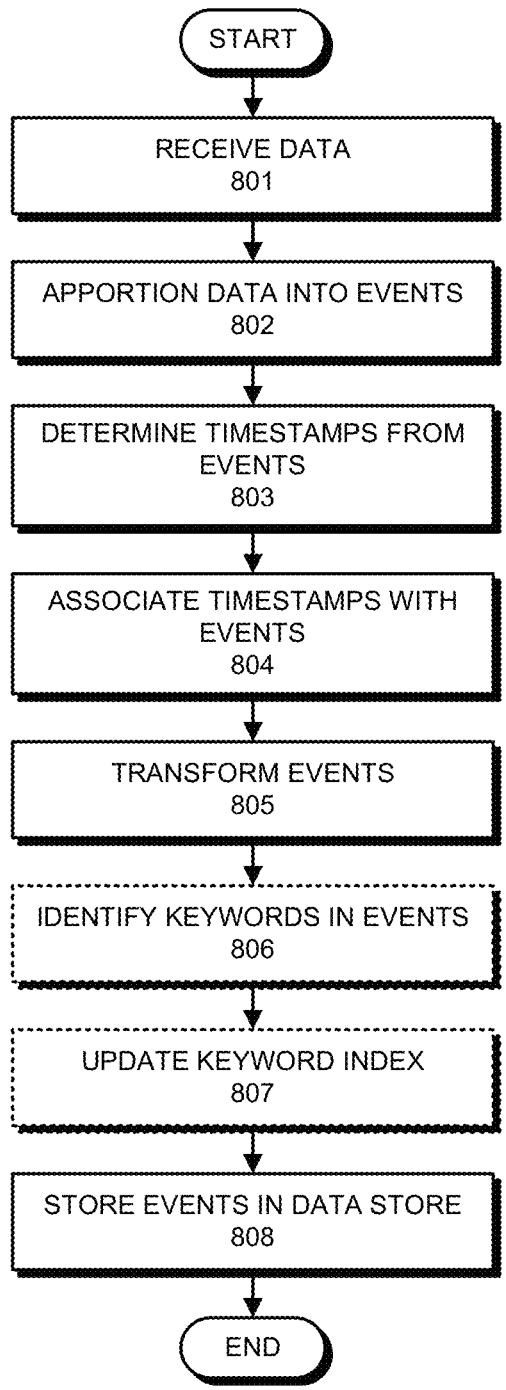
FIG. 8 presents a flowchart illustrating how indexers process, index, and store data received from forwarders in accordance with the disclosed embodiments.

FIG. 8 presents a flowchart illustrating how an indexer processes, indexes, and stores data received from forwarders in accordance with the disclosed embodiments. At block 801, the indexer receives the data from the forwarder. Next, at block 802, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 803. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 804, for example by storing the timestamp as metadata for each event.

Then, the system can apply transformations to data to be included in events at block 805. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 806. Then, at block 807 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 808, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 702 is responsible for storing and searching a subset of the events contained in a corresponding data store 703. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 9:
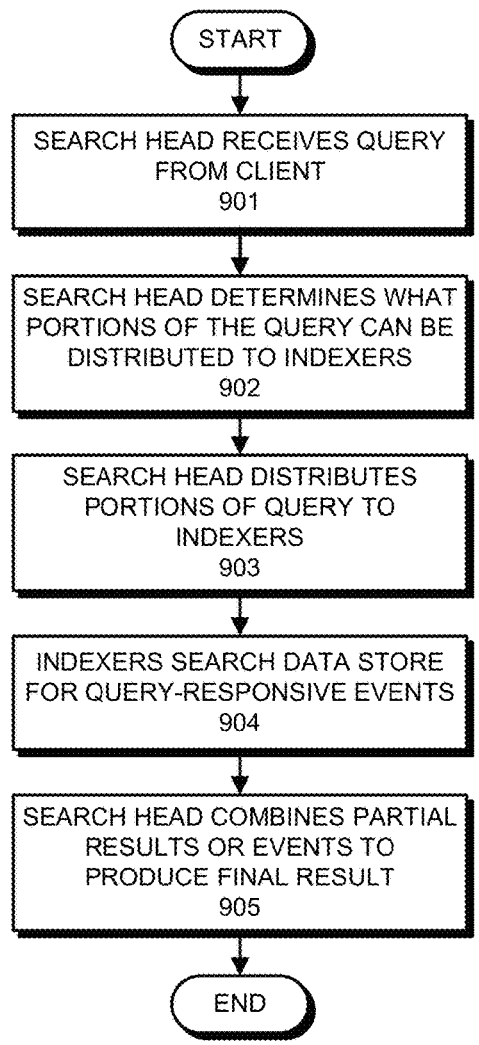
FIG. 9 presents a flowchart illustrating how a search head and indexers perform a search query in accordance with the disclosed embodiments.

FIG. 9 presents a flowchart illustrating how a search head and indexers perform a search query in accordance with the disclosed embodiments. At the start of this process, a search head receives a search query from a client at block 901. Next, at block 902, the search head analyzes the search query to determine what portions can be delegated to indexers and what portions need to be executed locally by the search head. At block 903, the search head distributes the determined portions of the query to the indexers. Note that commands that operate on single events can be trivially delegated to the indexers, while commands that involve events from multiple indexers are harder to delegate.

Then, at block 904, the indexers to which the query was distributed search their data stores for events that are responsive to the query. To determine which events are responsive to the query, the indexer searches for events that match the criteria specified in the query. These criteria can include matching keywords or specific values for certain fields. In a query that uses a late-binding schema, the searching operations in block 904 may involve using the late-binding schema to extract values for specified fields from events at the time the query is processed. Next, the indexers can either send the relevant events back to the search head, or use the events to calculate a partial result, and send the partial result back to the search head.

Finally, at block 905, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 700 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 10:
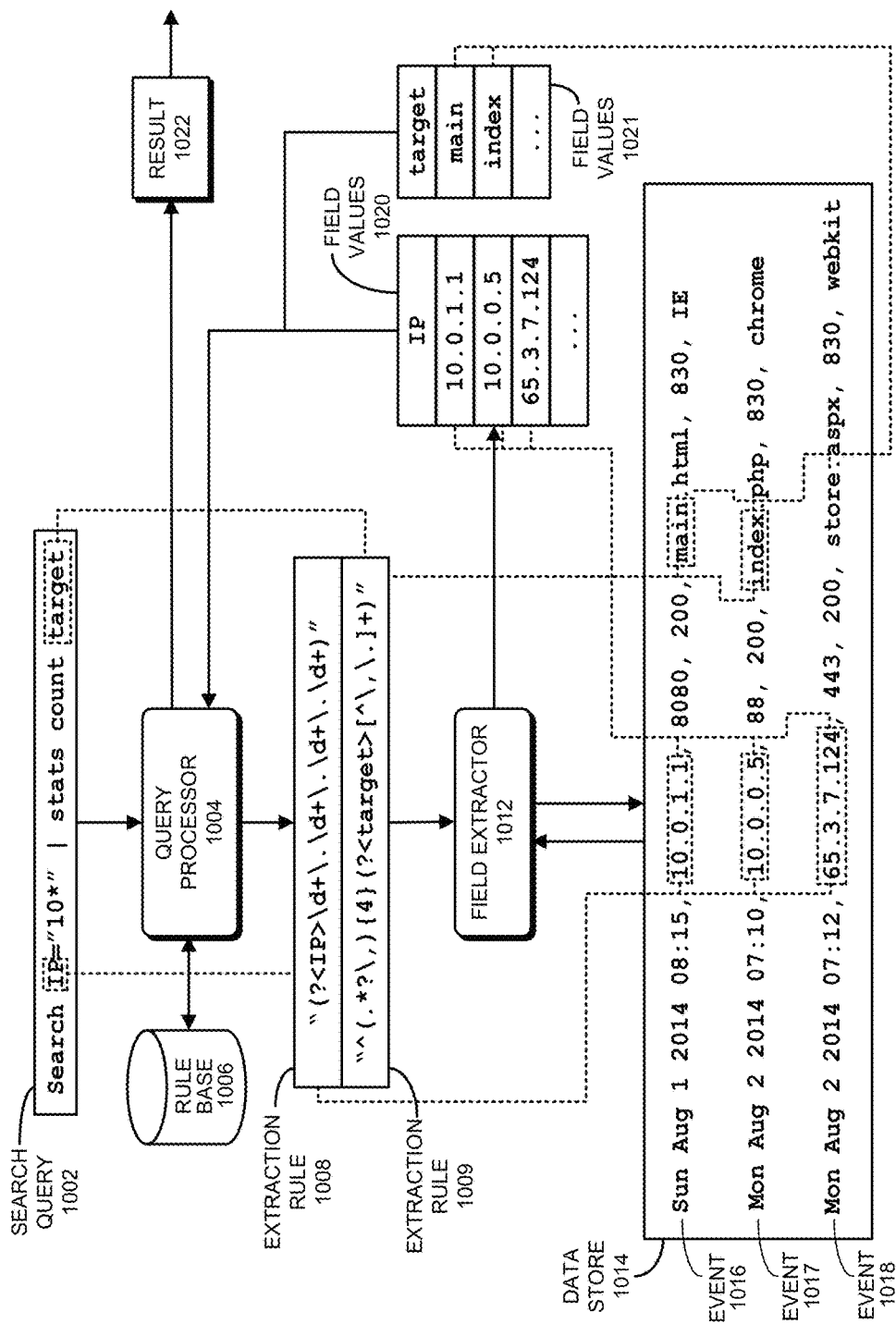
FIG. 10 presents a block diagram of a system for processing search requests that uses extraction rules for field values in accordance with the disclosed embodiments.

FIG. 10 presents a block diagram illustrating how fields can be extracted during query processing in accordance with the disclosed embodiments. At the start of this process, a search query 1002 is received at a query processor 1004. Query processor 1004 includes various mechanisms for processing a query, wherein these mechanisms can reside in a search head 704 and/or an indexer 702. Note that the exemplary search query 1002 illustrated in FIG. 10 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 1002, query processor 1004 sees that search query 1002 includes two fields "IP" and "target." Query processor 1004 also determines that the values for the "IP" and "target" fields have not already been extracted from events in data store 1014, and consequently determines that query processor 1004 needs to use extraction rules to extract values for the fields. Hence, query processor 1004 performs a lookup for the extraction rules in a rule base 1006, wherein rule base 1006 maps field names to corresponding extraction rules and obtains extraction rules 1008-1009, wherein extraction rule 1008 specifies how to extract a value for the "IP" field from an event, and extraction rule 1009 specifies how to extract a value for the "target" field from an event. As is illustrated in FIG. 10, extraction rules 1008-1009 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 1004 sends extraction rules 1008-1009 to a field extractor 1012, which applies extraction rules 1008-1009 to events 1016-1018 in a data store 1014. Note that data store 1014 can include one or more data stores, and extraction rules 1008-1009 can be applied to large numbers of events in data store 1014, and are not meant to be limited to the three events 1016-1018 illustrated in FIG. 10. Moreover, the query processor 1004 can instruct field extractor 1012 to apply the extraction rules to all the events in a data store 1014, or to a subset of the events that have been filtered based on some criteria.

Next, field extractor 1012 applies extraction rule 1008 for the first command "Search IP="10*"" to events in data store 1014 including events 1016-1018. Extraction rule 1008 is used to extract values for the IP address field from events in data store 1014 by looking for a pattern of one or more digits, followed by a period, followed again by one or more digits, followed by another period, followed again by one or more digits, followed by another period, and followed again by one or more digits. Next, field extractor 1012 returns field values 1020 to query processor 1004, which uses the criterion IP="10*" to look for IP addresses that start with "10". Note that events 1016 and 1017 match this criterion, but event 1018 does not, so the result set for the first command is events 1016-1017.

Query processor 1004 then sends events 1016-1017 to the next command "stats count target." To process this command, query processor 1004 causes field extractor 1012 to apply extraction rule 1009 to events 1016-1017. Extraction rule 1009 is used to extract values for the target field for events 1016-1017 by skipping the first four commas in events 1016-1017, and then extracting all of the following characters until a comma or period is reached. Next, field extractor 1012 returns field values 1021 to query processor 1004, which executes the command "stats count target" to count the number of unique values contained in the target fields, which in this example produces the value "2" that is returned as a final result 1022 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 12A:
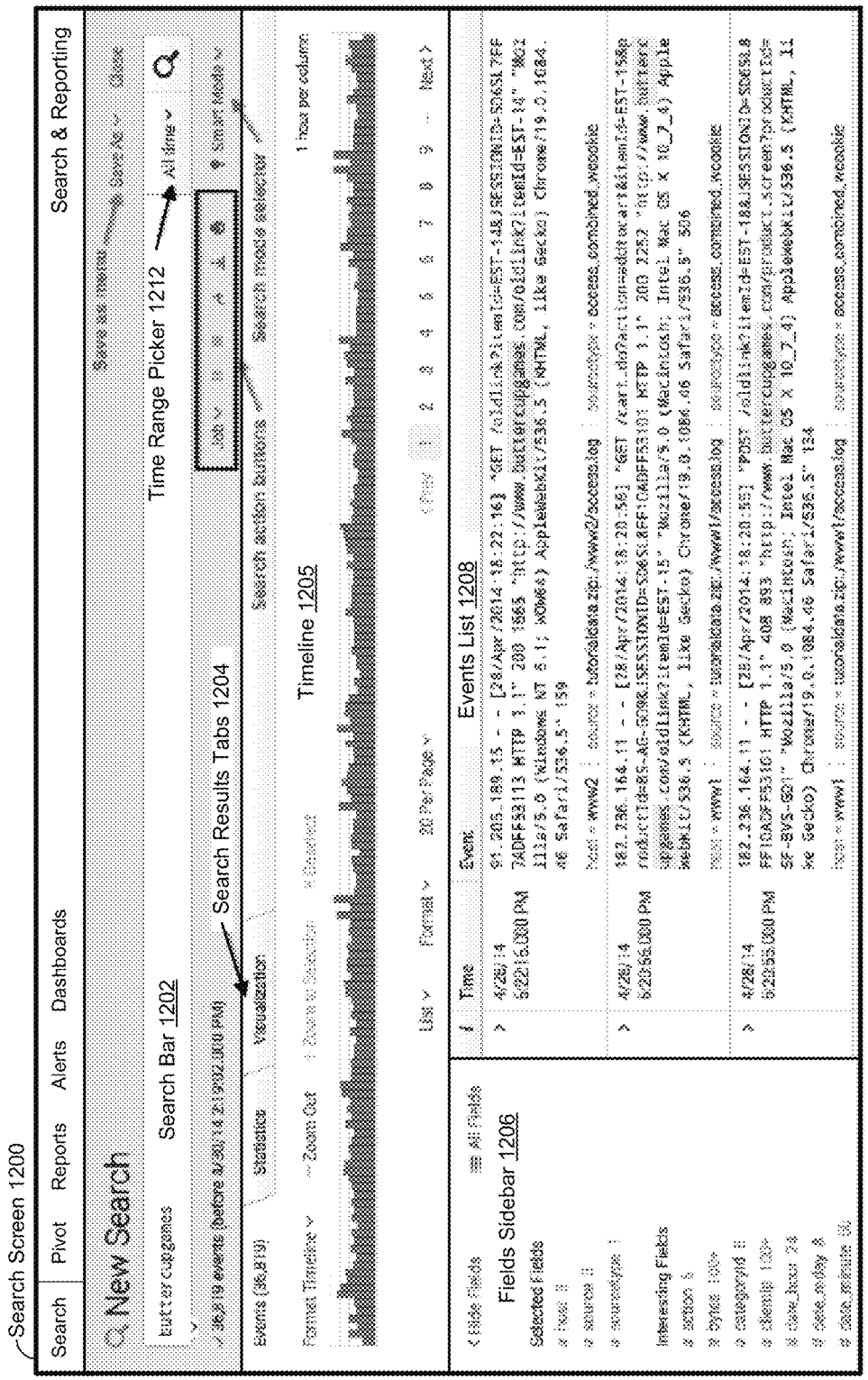
FIG. 12A illustrates a search screen in accordance with the disclosed embodiments.
Figure 12B:
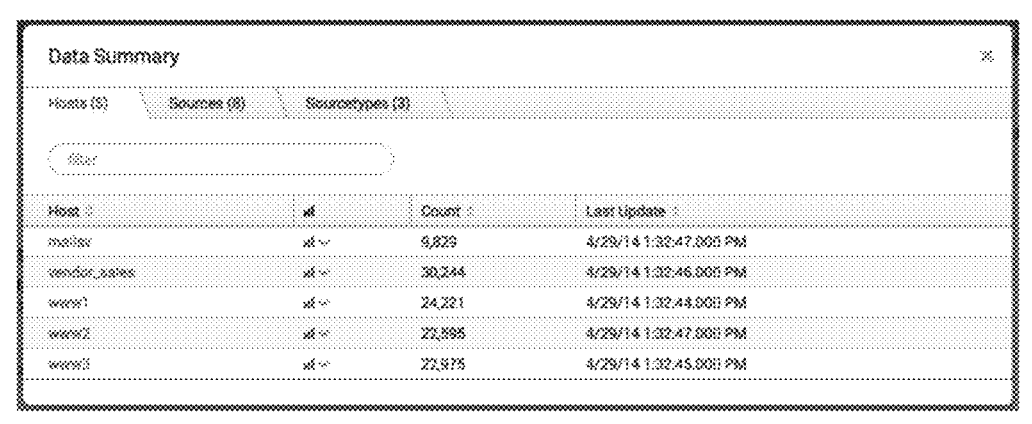

FIG. 12A illustrates an exemplary search screen 1200 in accordance with the disclosed embodiments. Search screen 1200 includes a search bar 1202 that accepts user input in the form of a search string. It also includes a time range picker 1212 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 1200 also initially displays a "data summary" dialog as is illustrated in FIG. 12B that enables the user to select different sources for the event data, for example by selecting specific hosts and log files.

After the search is executed, the search screen 1200 can display the results through search results tabs 1204, wherein search results tabs 1204 includes: an "events tab" that displays various information about events returned by the search; a "statistics tab" that displays statistics about the search results; and a "visualization tab" that displays various visualizations of the search results. The events tab illustrated in FIG. 12A displays a timeline graph 1205 that graphically illustrates the number of events that occurred in one-hour intervals over the selected time range. It also displays an events list 1208 that enables a user to view the raw data in each of the returned events. It additionally displays a fields sidebar 1206 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 11 illustrates how a search query 1101 received from a client at search head 704 can be split into two phases, including: (1) a "map phase" comprising subtasks 1102 (e.g., data retrieval or simple filtering) that may be performed in parallel and are "mapped" to indexers 702 for execution, and (2) a "reduce phase" comprising a merging operation 1103 to be executed by the search head when the results are ultimately collected from the indexers.

During operation, upon receiving search query 1101, search head 704 modifies search query 1101 by substituting "stats" with "prestats" to produce search query 1102, and then distributes search query 1102 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 9, or may alternatively distribute a modified version (e.g., a more restricted version) of the search query to the search peers. In this example, the indexers are responsible for producing the results and sending them to the search head. After the indexers return the results to the search head, the search head performs the merging operations 1103 on the results. Note that by executing the computation in this way, the system effectively distributes the computational operations while minimizing data transfers.

1.7.2 Keyword Index

As described above with reference to the flow charts in FIGS. 8 and 9, event-processing system 700 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 700 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucketby-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 13A:
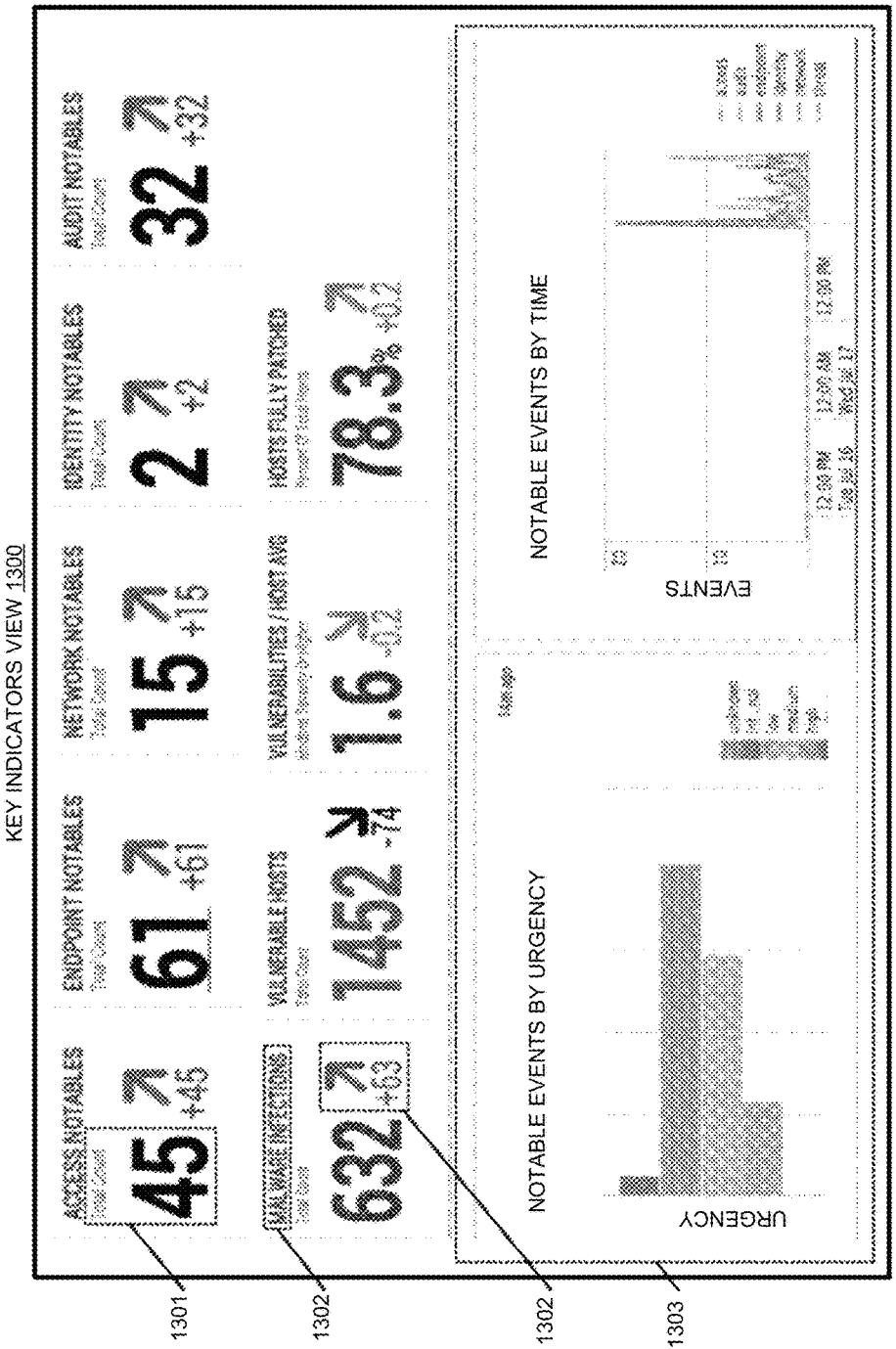
FIG. 13A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 13A illustrates an exemplary key indicators view 1300 that comprises a dashboard, which can display a value 1301, for various security-related metrics, such as malware infections 1302. It can also display a change in a metric value 1303, which indicates that the number of malware infections increased by 63 during the preceding interval. Key indicators view 1300 additionally displays a histogram panel 1304 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 13B:
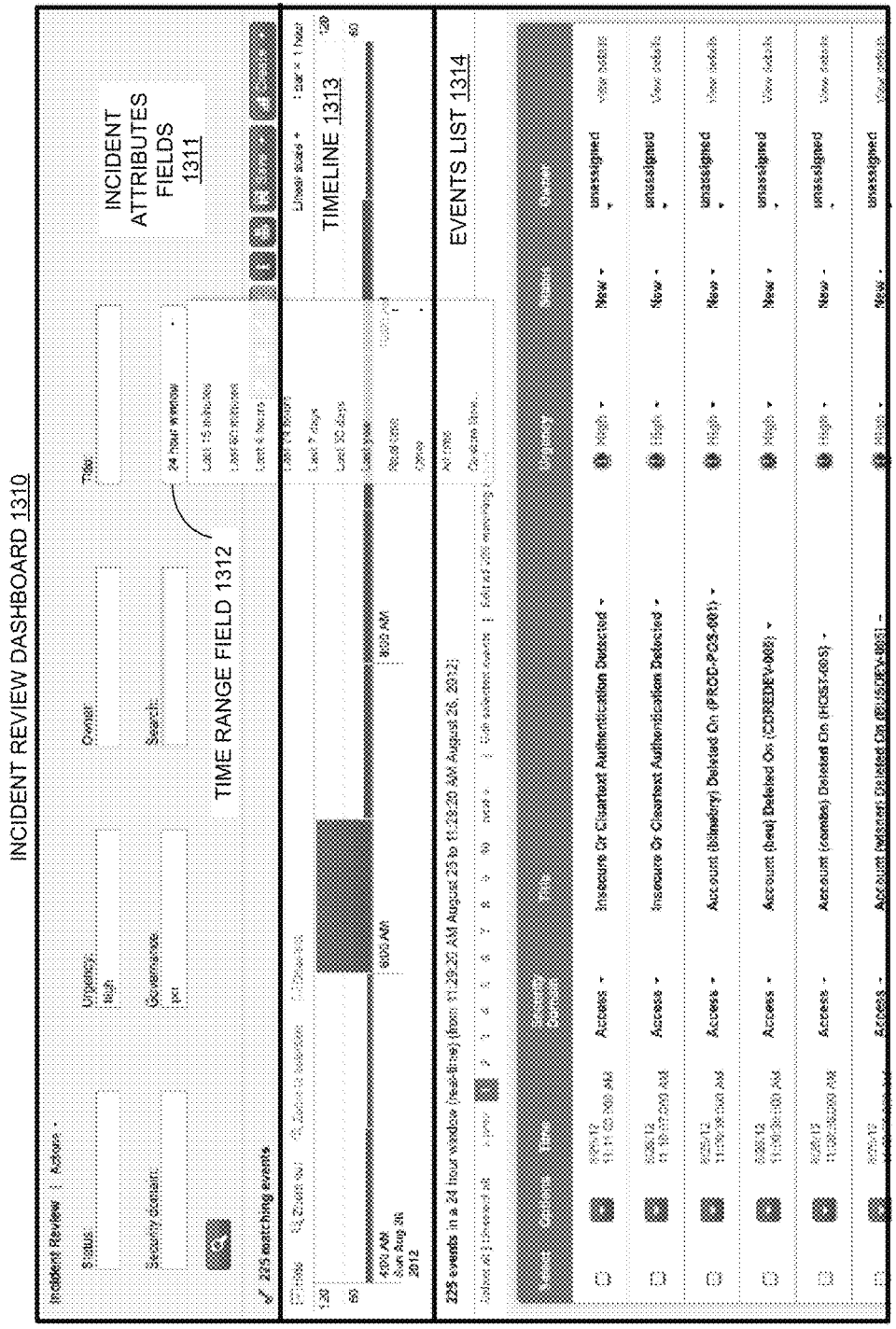
FIG. 13B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 13B illustrates an exemplary incident review dashboard 1310 that includes a set of incident attribute fields 1311 that, for example, enables a user to specify a time range field 1312 for the displayed events. It also includes a timeline 1313 that graphically illustrates the number of incidents that occurred in one-hour time intervals over the selected time range. It additionally displays an events list 1314 that enables a user to view a list of all of the notable events that match the criteria in the incident attributes fields 1311. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in http://docs.splunk.com/Documentation/PCI/2.1.1/User/IncidentReviewdashboard.

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 13C:
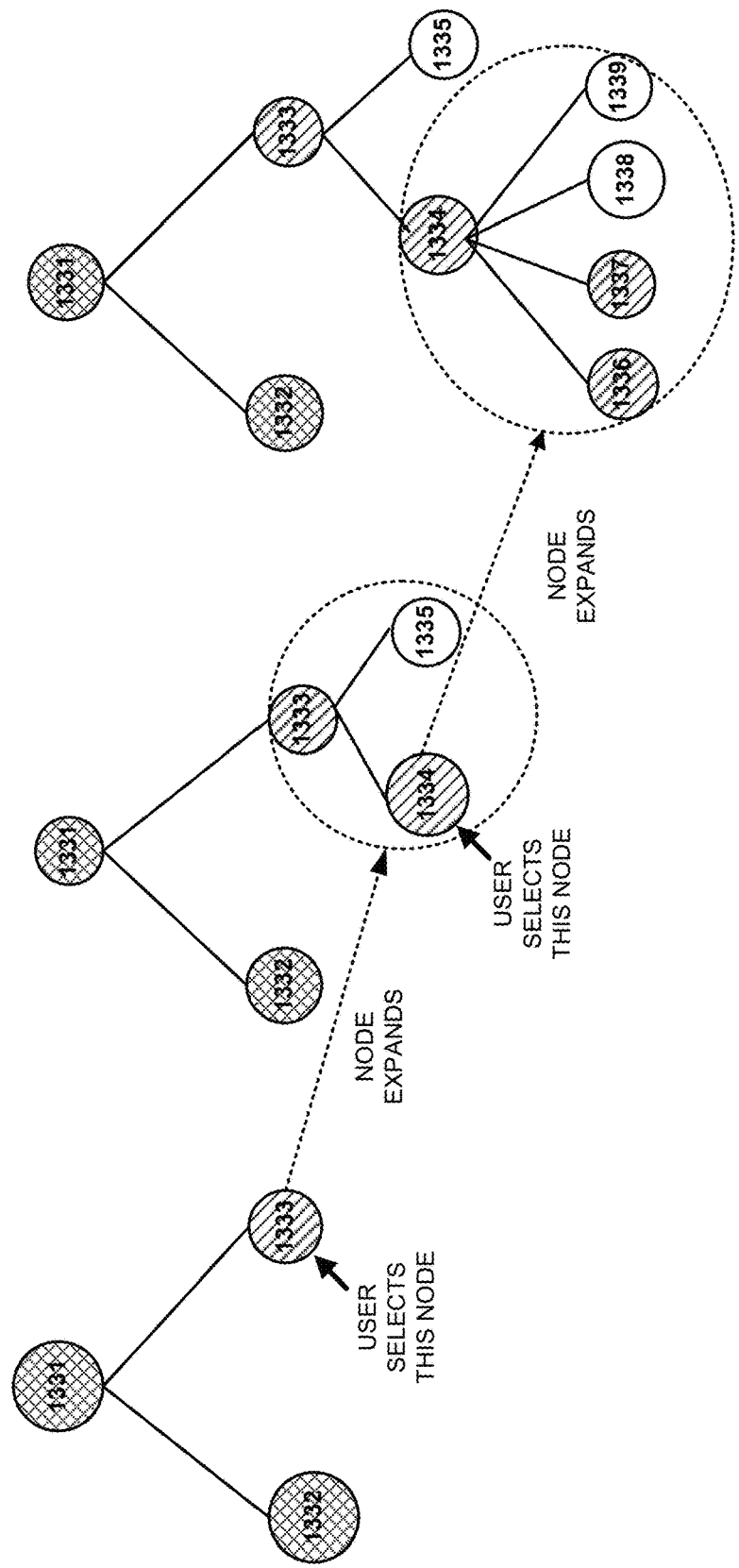
FIG. 13C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 13C, wherein nodes 1333 and 1334 are selectively expanded. Note that nodes 1331-1339 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 13D:
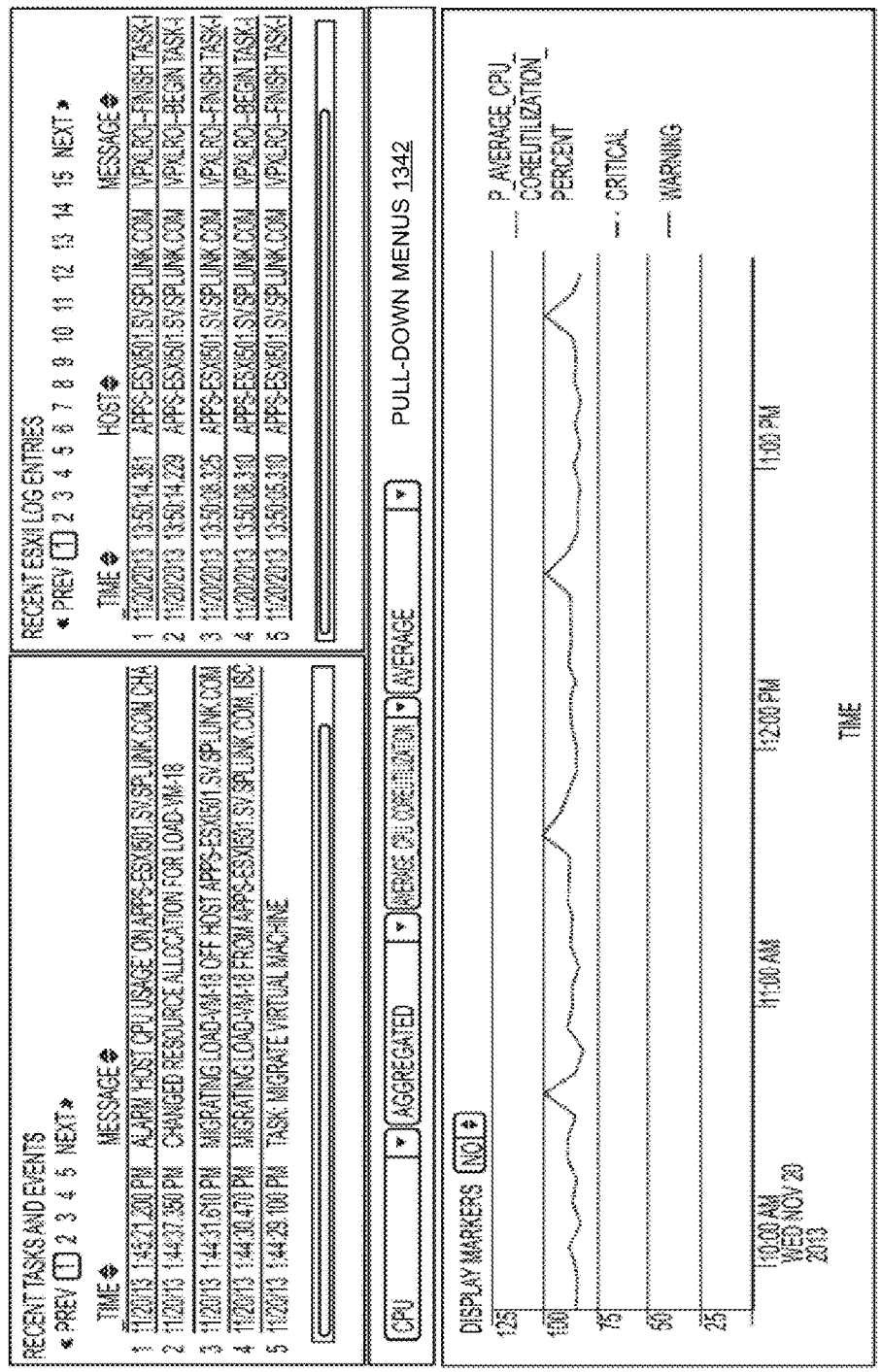
FIG. 13D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 13D displays a listing of recent "tasks and events" and a listing of recent "log entries" for a selected time range above a performance-metric graph for "average CPU core utilization" for the selected time range. Note that a user is able to operate pull-down menus 1342 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 14:
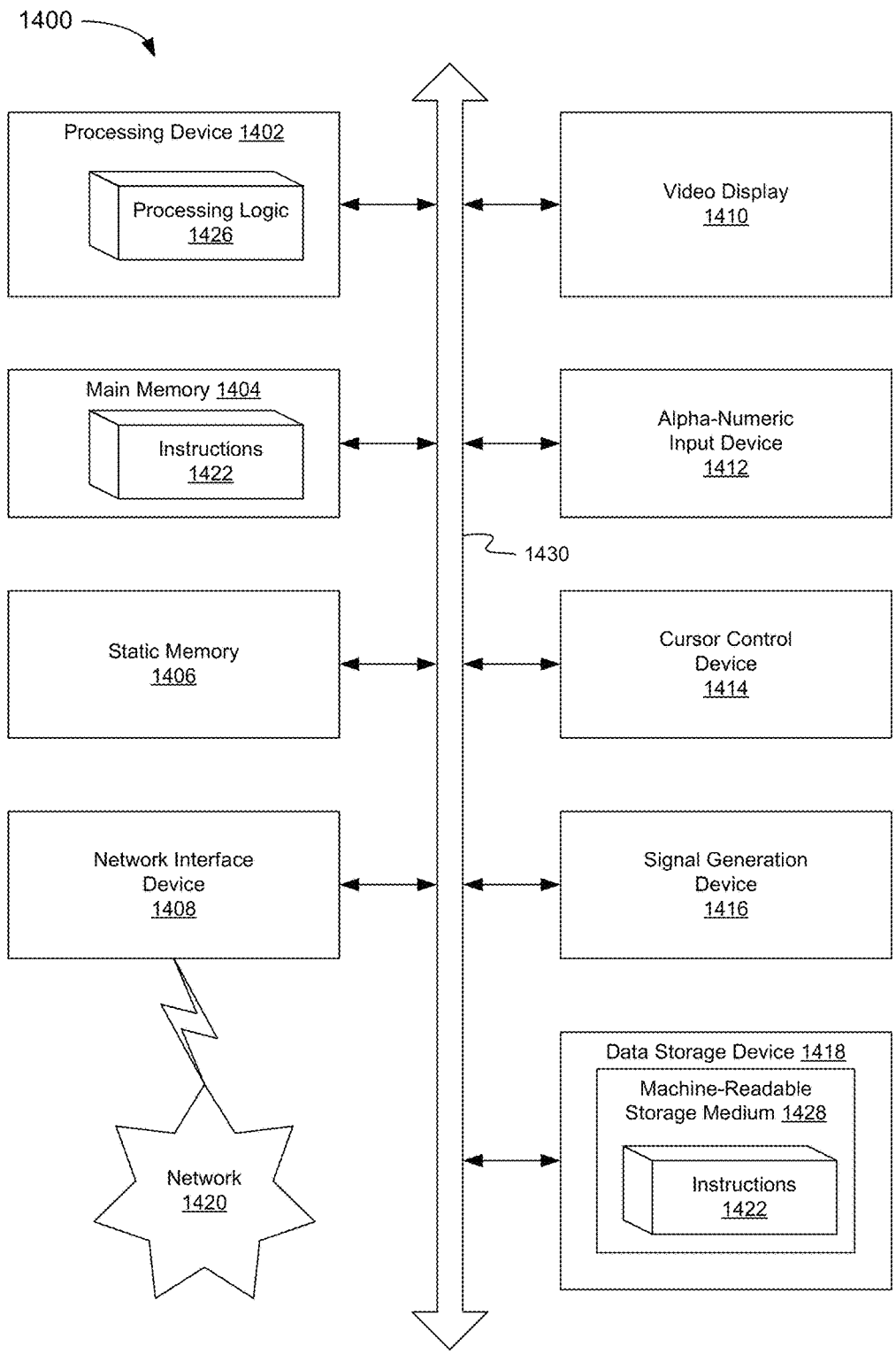
FIG. 14 is a block diagram illustrating an exemplary computer system, according to an embodiment.

FIG. 14 illustrates a diagrammatic representation of a machine in the exemplary form of a computer system 1400 within which a set of instructions, for causing the machine to perform any one or more of the methodologies discussed herein, may be executed. The system 1400 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1400 may represent system 700 of FIG. 7.

The exemplary computer system 1400 includes a processing device (processor) 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)), and a data storage device 1418, which communicate with each other via a bus 1430.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute the notification manager 210 for performing the operations and steps discussed herein.

The computer system 1400 may further include a network interface device 1408. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker).

The data storage device 1418 may include a computer-readable medium 1428 on which is stored one or more sets of instructions 1422 (e.g., instructions for search term generation) embodying any one or more of the methodologies or functions described herein. The instructions 1422 may also reside, completely or at least partially, within the main memory 1404 and/or within processing logic 1426 of the processing device 1402 during execution thereof by the computer system 1400, the main memory 1404 and the processing device 1402 also constituting computer-readable media. The instructions may further be transmitted or received over a network 1420 via the network interface device 1408.

While the computer-readable storage medium 1428 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for improving time-based searching of data, the method comprising:
   (a) receiving a first user input that specifies a first search query;
   (b) in response to the first user input that specifies the first search query,
      (b)(1) accessing events in a field-searchable data store, each event being associated with a time stamp and containing a portion of raw machine-generated data indicative of performance or operation of a component in an information-technology environment, wherein the raw machine-generated data contained in each event includes a plurality of strings associated with a corresponding time stamp, and wherein each string includes text, numbers, or a combination of text and numbers;
      (b)(2) applying a clustering algorithm to the accessed events to form at least one cluster of events, the clustering algorithm generating, for each event, an ordered list of keywords contained in the event, and grouping events into a same cluster when their respective ordered lists of keywords meet a similarity threshold, and wherein an ordering of the keywords in the ordered list of keywords for any particular event is based on positions of the keywords within the particular event;

(b)(3) for each cluster of the at least one cluster of events, after formation of the cluster, defining, from contents of the cluster, a set of one or more search terms as criteria for a corresponding search query that will retrieve at least one of the events of the cluster when executed against the accessed events, and storing the search terms in memory, wherein identifying the set of one or more search terms for a cluster of events is not part of forming a cluster of events, execution of the corresponding search query against the accessed events including evaluation of the search terms against the raw machine-generated data in the accessed events; and (b)(4) causing a display of a result of the first search query, the displayed result including an identification of each cluster of the at least one cluster of events;

(c) receiving a second user input that selects a first cluster of the at least one cluster of events, the second user input being responsive to display of the identification of each cluster of the at least one cluster of events; and (d) in response to the second user input that selects the first cluster, (d)(1) executing a second search query against the field-searchable data store to retrieve stored events that satisfy a criterion for similarity to the first cluster, the second search query including search terms previously associated with the first cluster as part of said defining, wherein executing the second search query includes retrieving from the memory the search terms previously associated with the first cluster; and (d)(2) causing display, to the user, of a result of the second search query, including causing display of an event that satisfies the second search query;

wherein the method is performed by one or more processing devices.

2. The method of claim 1, wherein the search terms identified for at least one cluster require the presence of a particular keyword in the events.

3. The method of claim 1, wherein the search terms identified for at least one cluster require the absence of a particular keyword in the events.

4. The method of claim 1, wherein the search terms identified for at least one cluster require the presence of a particular field-value combination in the events.

5. The method of claim 1, wherein identifying the set of search terms for the search query for a cluster comprises determining search terms that, when applied to the field-searchable data store, produce a set of events that includes each of the events in the cluster.

6. The method of claim 1, further comprising:
for a particular cluster, testing alternative combinations of search terms to discover one combination that better reproduces the events in the particular cluster than another combination when applied to the field-searchable data store.

7. The method of claim 1, further comprising saving the search query for a particular cluster as an event type.

8. The method of claim 1, further comprising:
saving the search query for a particular cluster as an event type that includes a reference name for the event type;
executing the search query defining the event type; and
tagging events retrieved by the search query with a tag corresponding to the reference name.

9. The method of claim 1, further comprising:
saving the search query for a particular cluster as an event type that includes a reference name for the event type;
determining that a particular event that has been displayed to a user satisfies criteria of a search query defining the event type; and
displaying the reference name for the event type in association with information about the particular event.

10. The method of claim 1, wherein applying the clustering algorithm to the events includes identifying one or more tokens in each event, the tokens comprising keywords.

11. The method of claim 1, wherein the clustering algorithm includes
generating a token vector for each of the events; and
grouping events having token vectors within a similarity threshold into a same cluster of the one or more clusters.

12. The method of claim 1, wherein identifying the set of search terms for each cluster comprises identifying one or more tokens included in the events in the cluster, the tokens comprising keywords.

13. The method of claim 1, wherein identifying the set of search terms for each cluster comprises identifying each of the events that contain a particular token.

14. The method of claim 1, wherein identifying the set of search terms for each cluster comprises determining a percentage of events that include a given token in each of the one or more clusters.

15. The method of claim 1, wherein identifying the set of search terms for each cluster comprises:
determining a percentage of events that include a given token in each of the one or more clusters; and
averaging the determined percentages for each of the one or more clusters.

16. The method of claim 1, wherein identifying the set of search terms for each cluster comprises determining a variance, across each of the one or more clusters, in a percentage of events in the one or more clusters that include a given token.

17. The method of claim 1, wherein identifying the set of search terms for each cluster comprises calculating a relevance score for each token in each of the one or more clusters, wherein the relevance score is based at least in part on a percentage of events in each of the one or more clusters that include a given token, an average of the percentages for each of the one or more clusters, and a variance in the percentages.

18. The method of claim 1, wherein identifying the set of search terms for a particular cluster comprises identifying a number of tokens having a highest relevance score for the particular cluster.

19. The method of claim 1, further comprising:
causing display of information about at least one of the clusters, a representative event from the cluster, and a percentage of a dataset included in the cluster.

20. The method of claim 1, further comprising:
causing display of the set of search terms for the search query identified for one of the clusters.

21. The method of claim 1, further comprising:
causing display of a particular search query that includes the search terms identified for one of the clusters.

22. The method of claim 1, further comprising:
causing display of a particular search query or an identifier of the particular search query that includes the search terms identified for one of the clusters;
receiving input indicating that a user wants to execute the particular search; and
based on receiving the input, causing execution of the search query.

23. The method of claim 1, wherein the events are accessed using a search language that uses a late binding schema.

24. The method of claim 1, wherein the search query is in a search language that uses a late binding schema.

25. The method of claim 1, wherein the events comprise time-stamped events.

26. A system for improving time-based searching of data, the system comprising:
a memory; and
a processing device coupled to the memory, the processing device configured to:
(a) receive a first user input that specifies a first search query;
(b) in response to the first user input that specifies the first search query,
(b)(1) access events in a field-searchable data store, each event being associated with a time stamp and containing a portion of raw machine-generated data indicative of performance or operation of a component in an information-technology environment, wherein the raw machine-generated data contained in each event includes a plurality of strings associated with a corresponding time stamp, and wherein each string includes text, numbers, or a combination of text and numbers;
(b)(2) apply a clustering algorithm to the accessed events to form at least one cluster of events, the clustering algorithm generating, for each event, an ordered list of keywords contained in the event, and grouping events into a same cluster when their respective ordered lists of keywords meet a similarity threshold, and wherein an ordering of the keywords in the ordered list of keywords for any particular event is based on positions of the keywords within the particular event;
(b)(3) for each cluster of the at least one cluster of events, after formation of the cluster, define, from contents of the cluster, a set of one or more search terms as criteria for a corresponding search query that will retrieve at least one of the events of the cluster when executed against the accessed events, and store the search terms in a data store, wherein identifying the set of one or more search terms is not part of forming a cluster of events, execution of the corresponding search query against the accessed events including evaluation of the search terms against the raw machine-generated data in the accessed events; and
(b)(4) cause a display of a result of the first search query, the displayed result including an identification of each cluster of the at least one cluster of events;
(c) receive a second user input that selects a first cluster of the at least one cluster of events, the second user input being responsive to display of the identification of each cluster of the at least one cluster of events; and
(d) in response to the second user input that selects the first cluster,
(d)(1) execute a second search query against the field-searchable data store to retrieve stored events that satisfy a criterion for similarity to the first cluster, the second search query including search terms previously associated with the first cluster as part of said defining, wherein execution of the second search query includes retrieving from the data store the search terms previously associated with the first cluster; and
(d)(2) cause display, to the user, of a result of the second search query, including causing display of an event that satisfies the second search query.

27. The system of claim 26, wherein the processing device further to:
save the search query for a particular cluster as an event type.

28. A non-transitory computer-readable storage medium storing instructions execution of which by a processing device causes the processing device to perform operations for improving time-based searching of data, the operations comprising:
(a) receiving a first user input that specifies a first search query;
(b) in response to the first user input that specifies the first search query,
(b)(1) accessing events in a field-searchable data store, each event being associated with a time stamp and containing a portion of raw machine-generated data indicative of performance or operation of a component in an information-technology environment, wherein the raw machine-generated data contained in each event includes a plurality of strings associated with a corresponding time stamp, and wherein each string includes text, numbers, or a combination of text and numbers;
(b)(2) applying a clustering algorithm to the accessed events to form at least one cluster of events, the clustering algorithm generating, for each event, an ordered list of keywords contained in the event, and grouping events into a same cluster when their respective ordered lists of keywords meet a similarity threshold, and wherein an ordering of the keywords in the ordered list of keywords for any particular event is based on positions of the keywords within the particular event;
(b)(3) for each cluster of the at least one cluster of events, after formation of the cluster, defining, from contents of the cluster, a set of one or more search terms as criteria for a corresponding search query that will retrieve at least one of the events of the cluster when executed against the accessed events, and storing the search terms in memory, wherein said identifying the set of one or more search terms is not part of forming a cluster of events, execution of the corresponding search query against the accessed events including evaluation of the search terms against the raw machine-generated data in the events; and
(b)(4) causing a display of a result of the first search query, the displayed result including an identification of each cluster of the at least one cluster of events;
(c) receiving a second user input that selects a first cluster of the at least one cluster of events, the second user input being responsive to display of the identification of each cluster of the at least one cluster of events; and (d) in response to the second user input that selects the first cluster,
- (d)(1) executing a second search query against the field-searchable data store to retrieve stored events that satisfy a criterion for similarity to the first cluster, the second search query including search terms previously associated with the first cluster as part of said defining, wherein executing the second search query includes retrieving from the memory the search terms previously associated with the first cluster; and
- (d)(2) causing display, to the user, of a result of the second search query, including causing display of an event that satisfies the second search query;

wherein the operations are performed by one or more processing devices.

29. The non-transitory computer-readable storage medium of claim 28, wherein the operations further comprise:

saving the search query for a particular cluster as an event type.

30. The method of claim 1, wherein identifying a set of one or more search terms is performed without user input after the clustering algorithm groups the events into the same cluster.

31. The method of claim 1, wherein each of the search terms requires at least one of: a presence of a particular keyword in the events, an absence of a particular keyword in the events, or meeting a criterion pertaining to a field in the events.

32. The system of claim 26, wherein each of the search terms requires at least one of: a presence of a particular keyword in the events, requires an absence of a particular keyword in the events, or meeting a criterion pertaining to a field in the events.

33. The non-transitory computer-readable storage medium of claim 27, wherein each of the search terms requires at least one of: a presence of a particular keyword in the events, requires an absence of a particular keyword in the events, or meeting a criterion pertaining to a field in the events.

34. A computer-implemented method for improving time-based searching of data, the method comprising:

(a) accessing events in a field-searchable data store, each event being timestamped and containing a portion of raw machine-generated data indicative of performance or operation of a component in an information-technology environment, wherein the raw machine-generated data contained in each event includes a plurality of strings associated with a corresponding time stamp, and wherein each string includes text, numbers, or a combination of text and numbers;

(b) applying a clustering algorithm to the accessed events to form at least one cluster of events;

(c) for each cluster of the at least one cluster of events,
- (c)(1) define a set of one or more search terms for a search query designed to retrieve one or more events in the cluster, and
- (c)(2) saving in memory the search query as an event type that includes a reference name, the event type being indicative of a subset of said events;

(d) causing a display, to a user, of the reference name of a particular event type corresponding to a particular cluster;

(e) receiving a user input that selects the particular event type corresponding to the particular cluster, the user input being responsive to the display of the reference name; and (f) in response to the user input that selects the particular event type corresponding to the particular cluster,
- (f)(1) executing a particular search query from the memory to retrieve stored events that satisfy a criterion for similarity to the particular cluster, the particular search query including search terms previously associated with the particular cluster, and
- (f)(2) causing display, to the user, of a result of the particular search query, including causing display of an event that satisfies the particular search query.

* * * * *